(12) United States Patent
Chopra

(10) Patent No.: US 6,913,553 B2
(45) Date of Patent: Jul. 5, 2005

(54) ADJUSTABLE EMERGENCY V-BELT

(75) Inventor: Kewal K. Chopra, Sterling Heights, MI (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 17 days.

(21) Appl. No.: 10/361,039

(22) Filed: Feb. 7, 2003

(65) Prior Publication Data

US 2004/0157692 A1 Aug. 12, 2004

(51) Int. Cl.[7] ............................ F16G 3/00; F16G 7/00
(52) U.S. Cl. ...................... 474/253; 474/255; 474/256
(58) Field of Search ................................ 474/252–253, 474/255–158, 265, 273; 24/33 R, 33 V, 31 B, 31 C, 31 F, 31 H

(56) References Cited

U.S. PATENT DOCUMENTS

| 3,680,380 A | * | 8/1972 | Kurrle ........................ 474/252 |
| 3,748,699 A | * | 7/1973 | Cunningham ................ 24/38 |
| 3,777,586 A | * | 12/1973 | Stirton ...................... 474/256 |
| 4,254,666 A | * | 3/1981 | Seredick .................... 474/253 |
| 4,437,849 A | * | 3/1984 | Berg ......................... 474/256 |
| 4,445,877 A | * | 5/1984 | Love et al. ................. 474/255 |
| 5,338,265 A | * | 8/1994 | Kilgar ....................... 474/256 |
| 5,988,927 A | * | 11/1999 | Pfarr ......................... 403/2 |

* cited by examiner

Primary Examiner—Marcus Charles
(74) Attorney, Agent, or Firm—David L. Kuhn; Luis Miguel Acosta; Thomas W. Saur

(57) ABSTRACT

An adjustable emergency use v-belt is formed with a tapered end having a plurality of teeth and a housing adapted to engage and hold the teeth when inserted into the housing to allow the belt to be adjusted to the desired length when replacing the normal v-belt used in vehicular applications.

1 Claim, 1 Drawing Sheet

ADJUSTABLE EMERGENCY V-BELT

STATEMENT REGARDING FEDERALLY SPONSORED RESEARCH

The invention described herein was made by a civilian employee of the United States Government in the course of his employment and during duty hours. Accordingly, title to the invention has been assigned to the Government and the invention can be made, produced, used and licensed by and for governmental purposes without paying me any royalty.

BACKGROUND OF THE INVENTION

This invention relates to an improved adjustable V-belt for use in automotive vehicles.

Military vehicles powered by conventional combustion engines require the use of a belt to connect the pulleys on various powered components to a crankshaft pulley. With most conventional vehicles it is impossible to operate the vehicle for any substantial period of time once the belt breaks. In fact, operation of the vehicle without the belt can easily cause overheating and further may result in the vehicle batteries being discharged. Thus when a belt breaks, the vehicle must either be towed or a new fan belt installed. Even if a new fan belt of the right size is available, installation of the fan belt in most vehicles requires that one of the pulleys be moved on an adjustable bracket in order to install the belt on the pulleys to be connected. The pulleys must then be moved to their original position and locked in place. Such an operation requires both tools and training making installation of a new belt time-consuming. Also, a belt of the proper size is necessary. Since each vehicle requires a different size belt, a large inventory of different emergency belts is required. This also prevents the use of one vehicle's belt on a different vehicle.

The present adjustable belt overcomes problems with prior art by providing a belt that is adaptable to a wide range of conventional vehicles employing a belt drive system. It can be readily installed without the need for tools to move brackets or otherwise adjust fasteners or other mechanical parts. The belt is easily adaptable to different sizes and is configured so that it may be easily removed for replacement by a permanent belt when available.

For the military this type of belt is particularly desirable since it can be used with the wide variety of different vehicles found in the military fleet. It can also be easily installed by personnel not trained in vehicle repair and mechanics without using tools., Also, the belt of this invention can be quickly installed which is particularly important for military vehicles that may need to be repaired to an operational condition rapidly and under conditions of grave danger.

SUMMARY OF THE INVENTION

A flexible power-transmitting belt of this invention solves the problems noted above. The belt has a flexible elongated body of unitary construction having a first end formed as a tapering cross section with a smaller cross section towards the end of the belt. The first end of the belt has a plurality of inclined teeth disposed on one surface. The second end of the belt has a housing mounted thereon, the housing having first and second apertures formed on opposite sides. The apertures in the housing are sized to allow the first end of the belt to pass through the housing. A pawl with multiple teeth is located within the housing the pawl having one end connected to the housing and there is an associated biasing means in the housing which acts on the pawl to bias the pawl to an engaging position. In the engaged position, the pawl's multiple teeth act as detents to engage the inclined teeth on the first end. A handle is attached to the pawl and extends through the housing to allow manual movement of the pawl against the biasing means.

DETAILED DESCRIPTION

Figure 1:
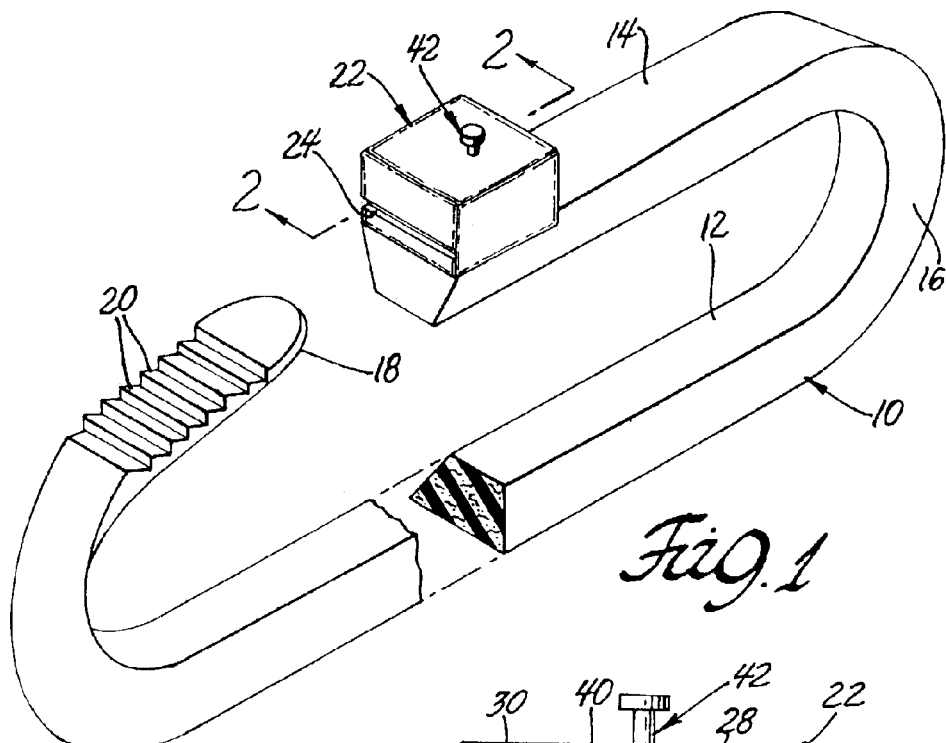
FIG. 1 is a perspective view of one embodiment of this invention.
Figure 2:
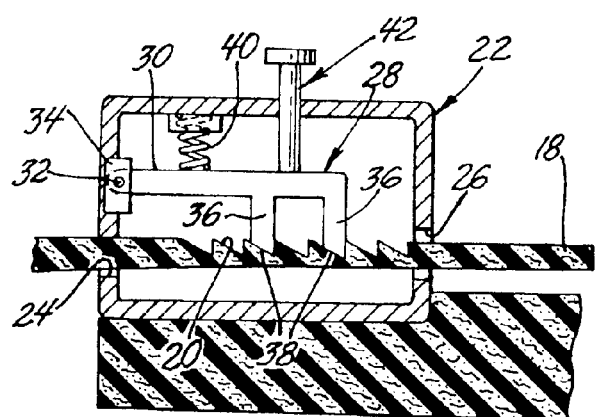
FIG. 2 is side view in section of the housing of FIG. 1.
Figure 3:
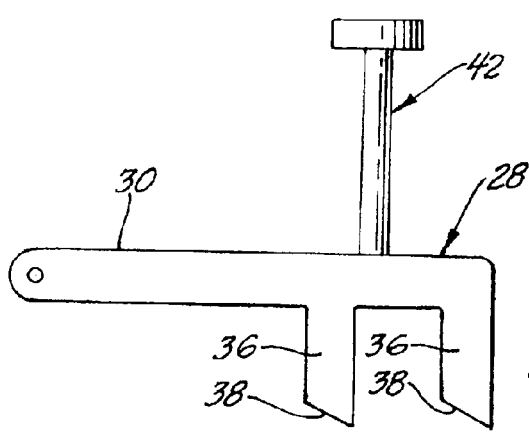
FIG. 3 is a side view of a pawl according to this invention.

Referring to the accompanying drawing wherein like numerals refer to like parts, in FIG. 1 a flexible power transmitting belt 10 is formed with an inner surface 12, outer surface 14 and side surfaces 16. As shown, the belt 10 has a V cross-section which is the most common cross section for use in vehicle power applications having a conventional pulley drive system (not shown) for power transmission from a prime mover to the various accessory drives. The belt 10 comprises a flexible elongated v-shaped body of unitary construction one example being the cord reinforced rubber material common to flexible belt construction. The belt 10 may be formed of other comparable synthetic materials such as nylon that have the requisite flexibility and strength. The belt 10 has a first end 18 formed with a tapering cross section with the smallest cross section area located nearest the end of the belt. A plurality of inclined steps form a plurality of teeth 20 on the outer surface of the belt at the first end 18.

A second end of the belt 10 has a housing 22 mounted on the outer surface 14. The housing 22 has first and second apertures 24, 26 respectively formed on opposite sides of the housing sized so that the first end 18 of the belt 10 can pass completely through the housing 22. A multi-toothed pawl 28 has one end 30 pivotally journaled by a pin 32 in a boss 34 mounted on a side of the housing 22. The pawl 28 has a second end with a plurality of detents 36 having angular faces 38 which are complimentary to the shape of the teeth 20. The pawl 28 has a biasing means 40, shown as a coil spring, located between the boss 34 and the detents 36. The biasing means 40 will move the detents 36 towards the upper surface 14 of belt 10 as it traverses the housings 22. The biasing means 40 keeps the detents 36 engaged with the teeth 20 when the first end 18 of belt 10 is inserted into the housing. To release teeth 20 from the pawl 28 a handle 42 is attached to the side of the pawl opposite the detents and on the same side as the biasing means 40. The handle 42 extends through the housing 22 to allow manual movement of the pawl 28 against the biasing means to a disengaged position. When the pawl 28 is disengaged, the first end of the belt 18 can be easily and freely withdrawn.

Various alterations and modifications will become apparent to those skilled in the art without departing from the scope and spirit of this invention and it is understood this invention is limited only by the following claims.

What is claimed is:

1. A flexible power transmitting belt for connecting at least two pulleys, comprising: an flexible elongated body of unitary construction, the body having a first end formed as a tapering cross section diminishing to a smaller cross section towards the first end of the belt, the first belt end having a plurality of inclined teeth disposed on one surface; a second belt end having a housing mounted thereon, the housing having first and second apertures formed on opposite sides of the housing, the apertures being sized so as to allow the first end of the belt to pass through the housing; a multi-toothed pawl having one end connected to the housing and a plurality of detents on the other end of the pawl; a biasing means associated with the housing and acting upon the pawl to bias the pawl to an engaging position; and a handle means attached to the pawl and extending through the housing to allow manual movement of the pawl against the biasing means to a disengaged position; whereby when the first end of the belt is inserted into the housing the detents will engage the inclined teeth and hold the belt in position until the pawl is disengaged by the handle.

\* \* \* \* \*